United States Patent
Woerner et al.

(10) Patent No.: US 12,198,149 B2
(45) Date of Patent: Jan. 14, 2025

(54) SYSTEM AND METHOD FOR PRODUCT AUTHENTICATION

(71) Applicant: emTRUTH, Inc., Glendale, CA (US)

(72) Inventors: Irene Woerner, Glendale, CA (US); Ronald Kong, Pasadena, CA (US)

(73) Assignee: emTRUTH, Inc., Glendale, CA (US)

( * ) Notice: Subject to any disclaimer, the term of this patent is extended or adjusted under 35 U.S.C. 154(b) by 464 days.

(21) Appl. No.: 16/226,684

(22) Filed: Dec. 20, 2018

(65) Prior Publication Data
US 2019/0197562 A1     Jun. 27, 2019

Related U.S. Application Data

(60) Provisional application No. 62/610,855, filed on Dec. 27, 2017.

(51) Int. Cl.
| | |
|---|---|
| G06Q 30/018 | (2023.01) |
| G06F 16/22 | (2019.01) |
| G06F 16/27 | (2019.01) |
| H04L 9/06 | (2006.01) |

(52) U.S. Cl.
CPC ..... G06Q 30/0185 (2013.01); G06F 16/2246 (2019.01); G06F 16/27 (2019.01); H04L 9/0643 (2013.01)

(58) Field of Classification Search
CPC . G06Q 30/0185; G06F 16/27; G06F 16/2246; G06F 16/9554; H04L 9/0643; H04L 9/3228; H04L 9/3239; H04L 9/12; H04L 2209/38
See application file for complete search history.

(56) References Cited

U.S. PATENT DOCUMENTS

| | | | |
|---|---|---|---|
| 2015/0244795 A1* | 8/2015 | Cantwell | G06F 16/27 |
| | | | 709/202 |
| 2016/0344737 A1* | 11/2016 | Anton | H04L 63/0815 |
| 2018/0115427 A1* | 4/2018 | Dequen | H04L 63/083 |
| 2018/0137164 A1* | 5/2018 | Bensberg | G06F 16/2456 |

\* cited by examiner

*Primary Examiner* — Fatoumata Traore
*Assistant Examiner* — Carlton Johnson
(74) *Attorney, Agent, or Firm* — Womble Bond Dickinson (US) LLP

(57) ABSTRACT

A product authentication management system is described. The system comprising at least one relational Merkle tree data store, wherein the relational Merkle tree data store comprising at least one child node, the child node having a linked parent node, the parent node is tagged with a hash of the child node, and child node is tagged with an inverse hash of the parent node.

7 Claims, 4 Drawing Sheets

SYSTEM AND METHOD FOR PRODUCT AUTHENTICATION

CROSS-REFERENCE TO RELATED APPLICATIONS:

This application is the U.S. utility application of and claims priority to U.S. provisional application No. 62/610,855 filed on Dec. 27, 2017, the disclosure of which is incorporated herein by reference in its entirety.

TECHNICAL FIELD

The present disclosure relates to product authentication and more particularly systems and methods for executing product authentication utilizing a data store platform with a bi-directional hash-tagged encrypted data store.

BACKGROUND

In the existing global economy, producers of raw materials or products rarely interact with intermediate or end users who may also be physically distant. Therefore, effective shipment and product authentication is vital to ensure product validity. Present day solutions for product authentication typically are for each business to run independent product authentication, product traceability or registration systems supporting just their company or products.

Current state of the art product authentication systems start with the producer creating alphanumeric serial or batch numbers that are entered into a centralized relational database management system (RDBMS). These alphanumeric serial or batch numbers are associated with related product information in a RDBMS, a digital database based on the relational model of data.

These product authentication systems may employ tags such as embedded radio-frequency identification (RFID) chips, holographic images or alphanumeric serial numbers imprinted on actual products as an expression of authenticity. RFID chips contain electronically-stored information and use electromagnetic fields to automatically identify and track tags attached to objects. Holographic images consist of two or more images stacked in such a way that each is alternately visible depending upon the angle of perspective of the viewer. The tags are a way to attach alphanumeric serial or batch numbers to the product.

Users verify product authenticity by entering the alphanumeric serial number into the producer's business system, such as its registration host website. After user entry, these alphanumeric serial numbers are compared against characters stored in the business system's RDBMS system. Product authentication is based on complete matches of user entered alphanumeric characters against store RDBMS characters.

State of the art product authentication systems as described above can be relatively easily defeated. In general, serial numbers should, but are not necessarily, unique, and are easily replicated. Even the tags for attaching the serial numbers to the products can be replicated. RFID chips have an embedded alphanumeric identifier that makes each chip unique, but counterfeit chips are possible, while holographic images are not unique and assume difficulty of reproduction as a barrier to duplication.

SUMMARY OF THE DISCLOSURE

A product authentication management system comprising at least one relational Merkle tree data store, wherein the relational Merkle tree data store comprising at least one child node, the child node having a linked parent node, the parent node is tagged with a hash of the child node, and child node is tagged with an inverse hash of the parent node. The system also comprising a noSQL data store comprising of at least one replicated child node, at least one replicated parent node, at least one replicated hash, and at least one replicated inverse hash, wherein the at least one replicated child node, the at least one replicated parent node, the at least one replicated hash, and the at least one replicated inverse hash are copied from and synchronized to a portion of the relational Merkle tree data store.

A method of synchronizing a heterogeneous data store platform, comprising: having a relational Merkle tree data store comprising at least one child node, wherein the child node having a linked parent node, the linked parent node is tagged with a hash of the child node, and the child node is tagged with an inverse hash of the linked parent node; replicating the at least one child node, the linked parent node, the hash and the inverse hash in the relational Merkle tree data store into at least one replicated child node, the replicated linked parent node, the replicated hash, and the replicated inverse hash in a noSQL data store; comparing a portion of the noSQL data store to the relational Merkle tree data store; finding the replicated hash to match the hash and the replicated inverse hash to match the inverse hash; and completing the synchronization.

A computer generated method for authenticating product sales, comprising: generating a unique product code for attachment to a physical product and generating an authentication code for a display; receiving and decrypting authentication code scanned from the display correlating authentication code with product code forming a validated connection transmitting confirmation of the validated connection for purchase of the physical product receiving and decrypting scanned product code to certify the physical product upon receipt; collecting fraudulent product data in case of failure to certify; and notifying manufacturer of fraudulent product.

A computer implemented method for executing algorithms in applications on computer systems with data residing in a shared distributed data store platform, the method comprising: having a user interface on portable devices, like a mobile application; user interface on computer devices, like web application; having a physical expression of secured and unique product code; generation and management of unique shipment or product codes; converting the parsed data into a shared shipment or product authentication and registration program; running the application programs on the distributed store platform; shipment or product authentication, confirmation and registration in both physically offline and online usage; storing the result set of the program in the distributed file store platform; synchronizing data across a distributed heterogeneous data store network; and presenting the result set through a user interface including analytics.

DETAILED DESCRIPTION

The present disclosure relates to product authentication and more particularly systems and methods for executing product authentication utilizing a data store platform with bi-directional hash-tagged encrypted datastore. Although the disclosure is described in terms of product authentication, it is recognized that the system and methods described herein can be also utilized for shipping authentication, product registration, and other related activities relating to physical products.

In general, hash is a mathematical algorithm that maps data of arbitrary size to a bit string of a fixed size and is designed to be a one-way function. This makes the hash impossible to reverse or invert, thus useful for encryption. A hash tree, or Merkle tree, is a tree of hashes in which the leaves are individual hashes of data blocks in, as an example, a file or set of files.

In the current disclosure, the pointing orientation of hashes are bi-directional, therefore include hashes of both parent and child nodes. This is unlike standard hash tags, such as those found in block chains, which are uni-directional storing only the hash of the child node in the parent node. Therefore, the Merkle tree of current disclosure is referred to as a relational Merkle tree since it captures relationships between nodes more completely than current art Merkle trees.

Also, data blocks can be of a heterogenous range of formats, media, definitions and types and can include, but not limited to, images, sound, movies or text expressed as different format types like, but not limited to, PDF, JPG, MPG or proprietary office formats like documents, spreadsheets or presentations. Data information can include not just product data but also shipping data, product history, product bill of materials, certification and qualification data, registration data, and more.

Figure 1:
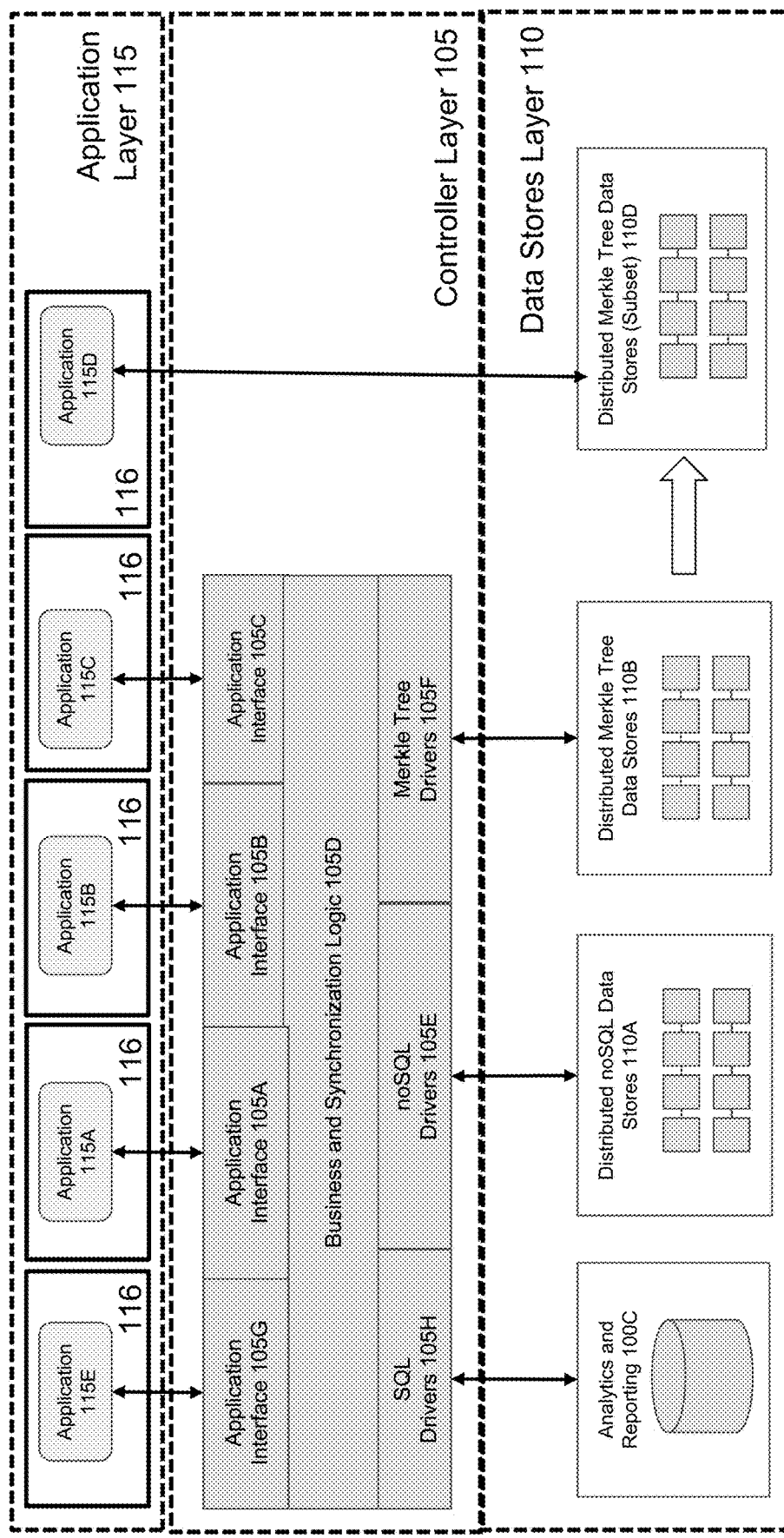
FIG. 1 shows an overview diagram of an exemplary system of an embodiment of the present disclosure.

FIG. 1 shows a product authentication management system 100, in accordance with an embodiment of the present disclosure. The product authentication system and methods described here can also be used for product registration, shipment authentication, and other similar functions.

The product authentication management system 100 in FIG. 1 has three layers. The first layer is an application layer 115, which connected with a controller layer 105. The application layer 115 can also connect with a data stores layer 110 directly or through the controller layer 105. The controller layer 105 is directly connected to the data stores layer 110.

The application layer 115 accepts queries and requests from users and may include input applications such as two-dimensional bar code, such as Quick Response (QR) Code, reader, optical, tactile, motion, image or other input functions. The application layer 115 can also have one or more output applications such as data presentation, or authentication code display in a variety of formats. The applications in the application layer 115 are marked as 115A, 115B, 115C, 115D and 115E. Each application can support one or more protocols like HTML, REST or proprietary application programming interfaces. Each application interacts with the real world and is hosted on application hardware 116. Application hardware 116 can be specific function hardware such as QR readers or general application hardware such as mobile phones, which can host the application to scan and authenticate physical products.

The product authentication system 100 also has a controller layer 105 which contains one or more application interfaces 105A, 105B, 105C, 105G. Each application interfaces and interacts with the appropriately matched application in the application layer 115. The controller layer 105 can encapsulate business and synchronization logic 105D to synchronize the distributed data stores. The controller layer 105 also has drivers for one or more of data store types and instances such as SQL driver 105E, noSQL driver 105F, Merkle tree driver 105H and others. SQL driver drives Structured Query Language, a standard language for database operation. SQL is typically used to run RDBMS type of datastore.

As shown in FIG. 1, the system has a data stores layer 110. The data stores layer 110 supporting shared distributed data stores and has multiple types of distributed data stores so it can be called a distributed heterogenous data store platform. The data stores layer 110 has a noSQL (not only SQL) data store 110A and a relational Merkle tree data store 110B that are synchronized in their data sets.

The noSQL data store 110A provides a mechanism for storage and retrieval of data that is modeled in means other than the tabular relations used in relational databases such as SQL. NoSQL data stores generally enable simpler scaling to a cluster of machines and better control for availability.

The relational Merkle tree data store 110B is a hash-encrypted data tree. Every leaf node is labeled with a data block and every non-leaf node is labeled with a cryptographic hash of its child nodes' labels. As described in [008], the pointing orientation of hashes are bi-directional in the current disclosure, therefore hashes of both parent and child nodes exist. This is unlike standard hash tags, such as those found in block chains, which are uni-directional storing only the hash of the child node in the parent node. The bi-directional hashes allow for greater relational information to be captured.

The relational Merkle tree data store 110B forms a foundation of an immutable chained record of shipment or product ownership in the current disclosure. The data stores layer 110 can also have a relational Merkle tree subset data store 110D, which stores a subset of the relational Merkle tree data store 110B for faster access.

Figure 2:
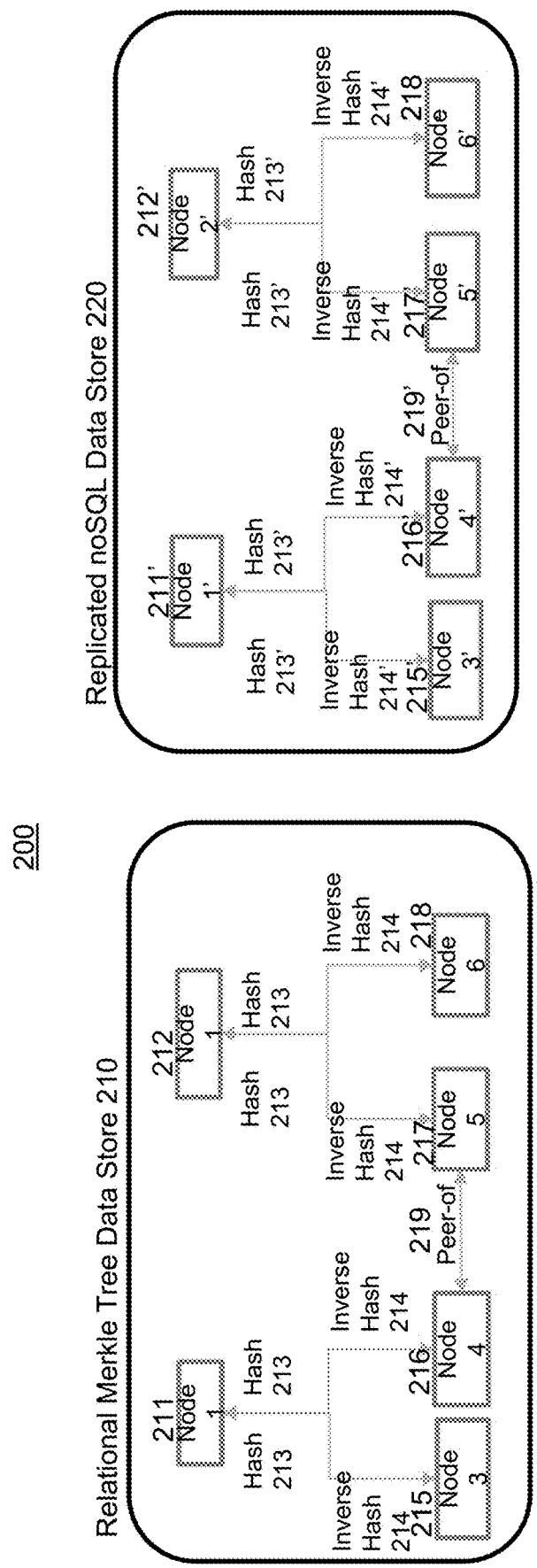
FIG. 2 shows a diagram of an exemplary heterogenous data store

Keeping heterogenous distributed data stores, such as the noSQL data store 110A and the relational Merkle tree data store 110B in sync is an aspect in the current disclosure, and will be elaborated in FIG. 2 descriptions. Using distributed Merkle-based hashed trees is computationally intensive, because of computation required for an independently vetted confirmation for data integrity by distributed instances. As such, the current disclosure can, for example, store ownership data needed for provenance in relational Merkle tree data stores 110B. This set of data will be considered master data with relational Merkle tree data store 110B as the system of record. Integration and synchronization with the noSQL data store 110A as secondary data provides greater efficiency while maintaining data integrity. Master data is a single source of business data used across multiple systems, data stores, applications, and/or processes.

The data store layer can support a heterogenous distributed data store network comprised of noSQL, Merkle tree and SQL/RDBMS data stores. The synchronization of a heterogenous distributed data store may be managed by synchronization algorithms in the business and synchronization logic 105D. Finally, analytics and reporting 110C can pull SQL data through the SQL driver 105H.

FIG. 2 shows a diagram of an example data stores layer 200 of the data stores layers 115 described in FIG. 1 in an embodiment of the present disclosure.

The data stores layer 200 in FIG. 2 contains a relational Merkle tree-based data store, 210, a hash-encrypted network with child nodes 215, 216, 217, and 218 and parent nodes 211 and 212. Each child node can be a leaf node or a non-leaf node. Each parent node can have one or more children while a child node can only have one parent. The parent nodes 211 and 212 can each also be a child node to its respective parent nodes while the child nodes 215, 216, 217, and 218 can each be a parent node to its respective child nodes if it is not a leaf node.

Every leaf node is labelled with the hash of a data block and every non-leaf node is labelled with the cryptographic hash of the labels of its child nodes respectively. This representation is typical current hash trees. For example, a parent node 211 would have a hash label, shown on FIG. 2 as a parent label 213, from its child leaf node 215 and another parent label 213 from its child node 216. A second parent node 211 would have a parent label 213 from its child node 215 and another parent label 213 from its child node 216

In some embodiments of the current disclosure, there is also an inverse hash where every child node is labelled with the cryptographic hash of the labels of its respective parent nodes. For example, child node 215 would have an inverse hash, shown on FIG. 2 as child label 214, of its parent node 211 and child node 216 would also have an inverse hash child label 214, of the same parent node 211.

In some embodiments, peer label 219 can also be utilized to tag related child node 216 and child node 217. The use of peer labels 219 can be selective or non-selective This support of semantic values in the hash of the parent labels 213, child labels 214, and peer labels 219 enables optimization of traversals when retrieving paths of data blocks associated with a specific query.

These cryptographic data blocks and parent, child, and peer labels in aggregate, in this embodiment, represents the embedded data structure.

The data blocks in the relational Merkle tree data store 210, including the semantic parent labels 213, child labels 214 and peer labels 219, is duplicated into a noSQL data store 220. The noSQL data store 220 has child nodes 215', 216', 217', and 218', parent nodes 211' and 212', and parent labels 213', child labels 214', and peer labels 219'. Each node and label in the noSQL data store is the duplicate of its respective counterpart in the Merkle tree data store 210. For example, the child node 215' is a duplicate of child node 215. The storage of duplicate data in two different data stores allows for the performance and retrieval methods optimized and unique to each type of data store to be exploited without compromise to the integrity of the data. The Merkle tree data store 200, is the master data and system of record for data blocks, including embedded data structures The parent, child, and peer relationships are encapsulated by the parent labels 213, child labels 214 and peer labels 219, as part of the underlying data structures stored in both distributed Merkle tree data stores 210 and distributed noSQL data stores 220.

To keep data stored across distributed heterogeneous data stores in sync, the current disclosure uses utilizes algorithms to support commit and rollback actions in both noSQL and Merkle tree-based data stores. In rollback algorithms, data states are maintained and managed such that data can be reverted to a previous state. Rollback is used to maintain integrity of data, especially in the event of failure or an incomplete operation. Commit algorithms make data and data structure changes visible to other distributed data stores The distributed Merkle tree data store 210 in FIG. 2 shows a representative node relationship which is applicable to the Merkle tree data stores 110B or Merkle tree subset data store 110D of FIG. 1.

Figure 3:
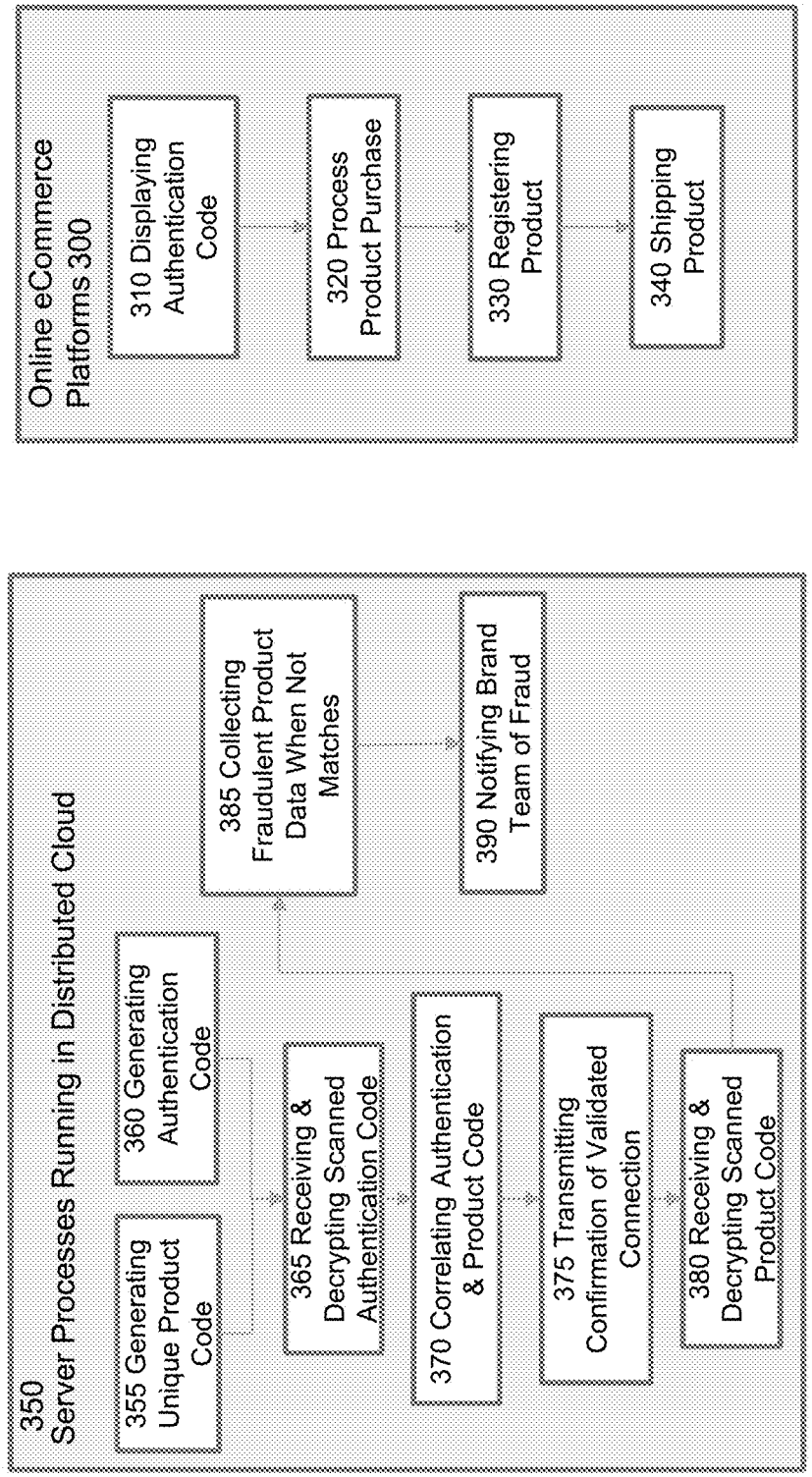
FIG. 3 show diagram of an exemplary method of providing product authentication and registration, in accordance with some embodiments of the present disclosure

FIG. 3 shows exemplary methods of providing product authentication and registration, in accordance with some embodiments, for validating authenticity of product prior to purchase online, presented option to purchase validated product, automatic registration upon purchase and validation of product upon receipt.

In this embodiment, client processes running on user devices like phones, tablets or computers initiate a request for product information on a commerce system or platform 300. Requests are made by selecting a product on a commerce system or platform 300. On receipt of this request, a commerce system or platform 350 makes a request to server process 311 running in a distributed cloud configuration.

For this embodiment, the set of authentication codes is generated in a step 360 associated with a product was derived correlating the set of unique product codes generated in a step 355 to a set, equal in number, of authentication codes generated by 350. Because authentication codes expire and are unique to a single shopping session, the number of mapped authentication codes to a unique product can be more than 1. The authentication and product code correlator expressed in 350 controls the logic for this.

In this example, a pre-formatted authentication code is provided through 314 application programming interfaces in a step 310 on the commerce platform 300 to display. A user scans this code using the current disclosure's client processes running in a client application. From the server process side, a step 365 Receiving & Decrypting Scanned Authentication Code is then followed by a step 370 Correlating Authentication & Product Code, then a step 375 Transmitting Confirmation of Validated Connection to the user.

The server process presents a message or notification on the user's device indicating if the product is authentic. If authentic, 300 presents an option to purchase the product sending the purchase related data back in a processing the purchase step 320 on the commerce platform 300 to complete the transaction.

For this example, if authentication code is not valid, 350 collects user supplied fraudulent data in a step 385 and then notify a pre-defined list of people of potential fraud in a step 390.

As part of completing a purchase transaction, in this embodiment, 300 sends successful purchase event 320 to server processes 350 running in a distributed cloud to add registration event in a step 330 to full history of a product as stored in FIG. 2.

In this embodiment, a commerce platform will ship product in a step 340 following their own process. On receipt by user, scanning a product code will confirm that an authenticate product was delivered. This product code scanning event is also registered as part of full product history stored in a distributed Merke tree data store.

Figure 4:
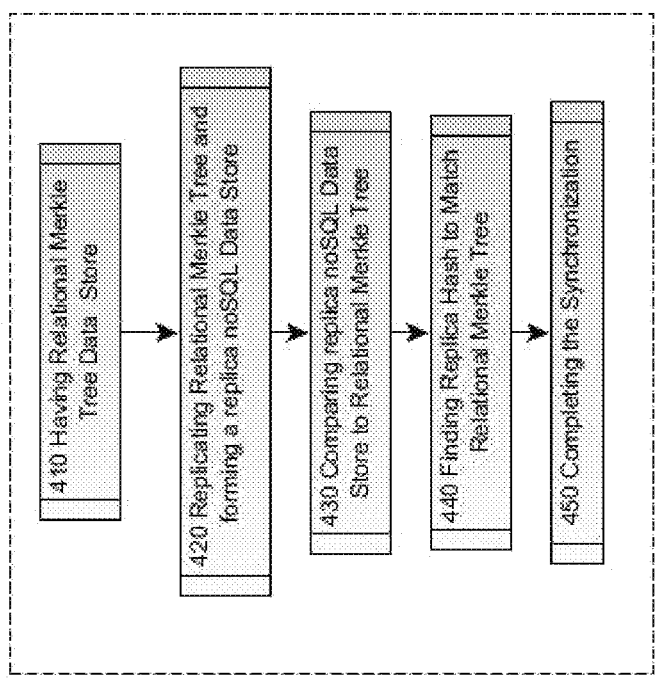
FIG. 4 shows a diagram of an exemplary method for synchronizing a heterogeneous data store platform.

Referring now to FIG. 4. A diagram is shown for an exemplary method for synchronizing a heterogeneous data store platform. The method 400 of synchronizing a heterogeneous data store platform, comprising: having in a step 410 a relational Merkle tree data store comprising at least one child node, wherein the child node having a linked parent node, the linked parent node is tagged with a hash of the child node, and the child node is tagged with an inverse hash of the linked parent node; replicating in a step 420 the at least one child node, the linked parent node, the hash and the inverse hash in the relational Merkle tree data store into at least one replicated child node, the replicated linked parent node, the replicated hash, and the replicated inverse hash in a noSQL data store; comparing in a step 430 a portion of the noSQL data store to the relational Merkle tree data store; finding in a step 440 the replicated hash to match the hash and the replicated inverse hash to match the inverse hash; and completing in a step 450 the synchronization.

The synchronization of the relational Merkle tree data store and the duplicate noSQL data store assures the accuracy of the data and can be executed at regular interval. If the either the hashes or the inverse hashes or both are found to not match, then the data in the noSQL data store would be erased, and a new copy made from the relational Merkle tree data store.

The current disclosure i) can further simplifies entry of unique shipment or product identifier through scanning of an encrypted QR code or any encrypted unique identifier device or image; ii) increases protection against fraudulent creation of shipment or product identifiers; iii) improves security of buying authenticated products; and iv) stores information in a more robust shared framework that provides an immutable chain for proof of product ownership. A QR code or quick response code consists of black squares arranged in a square grid on a white background, which can be read by an imaging device such as a camera and processed using Reed-Solomon error correction until the image can be appropriately interpreted. The required data is then extracted from patterns that are present in both horizontal and vertical components of the image.

The current disclosure can use QR codes as an expression of a unique encrypted shipment or product identifier and are attached or associated with a product. Like RFID chips, each product has a unique shipment or product identifier. Unlike RFID chips, any information provided is at the discretion of each user, in support of user and data privacy. Unlike holograms, product identifiers are unique. Unlike serial numbers, encrypted product identifiers are not easily falsified. Secure QR codes are just one point of interface or device technology providing current disclosure with a unique identification code per product or manufacturing lot. This unique identification code is the starting point of traceability for an individual product within the current disclosure.

The current disclosure provides a different layer of abstraction for interfacing with different types of encrypted unique product identifiers. This facilitates integration of additional methods or devices, like RFID chips or location-based beacons, as these technologies become mature and available in the market place. The basis of integration is through a secure protocol for passing the encrypted identifier physically stored or represented in these interfaces or devices like QR codes or RFID chips.

For the current disclosure, users use a computer or device to scan an encrypted unique identifier generated by the current disclosure's proprietary computer algorithms. An associated proprietary computer algorithm is used to decrypt each unique shipment or product identifier generated by the system. The method of shipment or product identifier generation incorporates a mix of different cryptographic methods.

In the event an invalid or fraudulent shipment or product identifier is detected, the current disclosure prompts a user to provide more information about the fraudulent shipment or product as well as collect user-related information that is securely transmitted to proprietary computer algorithms that commits information to a shared distributed data store platform and notifies a predefined set of users to potential fraud detection.

With the current disclosure, users are presented with multiple opportunities along the purchase process to validate product authenticity, including upon receipt of shipment or product and a confirmation scan of the unique shipment or product identifier. All shipment or products identifiers are associated with unique person or entity identifiers to i) provide businesses future opportunities to communicate with these users, ii) provide users with their personal repository of ownership proof, and iii) provide a mechanism for identifying products that are being recalled.

Meaningful product information related to what a product is made of, where a product and its components come from, and what has been done or actions associated with this product, like purchase or fraud report, are all captured in the underlying Merkle tree-based data store as the system of record.

Information about a product and its components can be represented in a broad range of formats, media and definitions. Information can include, but not limited to, images, sound, movies or text expressed as different format types like, but not limited to, PDF, JPEG, MPEG or proprietary office formats like documents, spreadsheets or presentations. Portable Document Format (PDF) is a file format developed by Adobe in the 1990s. JPEG are compressed files using Joint Photographic Experts Group (JPEG) method of lossy compression for digital images. MPEG are compressed files using Moving Picture Experts Group (MPEG) compression standard.

QR codes are currently widely used for 1) directing users to a universal resource locator (URL) for additional information, 2) virtual business card, and 3) serial numbers. While most applications, especially marketing, follow a standard that allows QR codes to be read by any standard QR code reader, there are a few applications that encrypt QR codes to enhance security. The current disclosure makes use of encrypted QR codes in a slightly different way; specifically, the current disclosure encrypts the QR code to make falsifying a QR code very computationally difficult and requires the current disclosure's proprietary algorithms and encrypted at rest data stores to decrypt QR codes for use in shipment or product authentication. Encryption techniques used include assignment of a shipment or product unique password that is embedded with a potentially known serial number along with other identifiers known only to this proprietary application. The resulting alphanumeric string embedded in the QR code can also be encrypted as another layer of obfuscation. This approach results in a unique shipment or product identifier for each shipment or product that is difficult to falsify, predict and expose. Codes generated by the current disclosure effectively behave like a public key.

Because serial numbers are only one component of a unique shipment or product code created by the current disclosure, existing or unencrypted serial numbers generated by businesses can be included for internal business system reference to additional information like product description, supply chain movement, sourcing or provenance. Unique shipment or product codes are attached to shipment or products through various types or styles of labels, including but not limited to, fabric, paper, holographic medium, plastic, silicon, metal or leather. Unique product codes can also be attached to products via RFID chips or threads.

The current disclosure incorporates an easy to use interface for simplified deployment and training. Using this interface, users manage generation and assignment of unique shipment or product codes. Proprietary algorithms, accessed through this user interface, generate non-predictive codes that incorporate known or viewable information as a component of the overall shipment or product code. In addition to random alphanumeric character generation unique to each product code, additional identifiers useful only within the context of the current disclosure are incorporated.

For the current disclosure, authenticated users employ algorithms accessed through an application hosted on portable devices, like mobile phones, to scan and authenticate shipment or product codes in this proprietary system. Existing QR code scanners will not provide any meaningful information from shipment or product codes generated by the current disclosure.

Because it is possible to duplicate a shipment or product code in its entirety, the current disclosure incorporates heuristic-based intelligence and other logic at the business logic application layer to notify and prevent multiple counterfeit shipment or products assigned a valid single shipment or product code.

In addition to providing a shared platform for shipment or product authentication, the current disclosure provides a shared platform for user registration of product. Most registration systems support individual businesses. The inconvenience of separate registration requiring many of the same data elements, like name and contact information, contribute to a low rate of registration. Also contributing to a low rate of registration is use of entered personal information that businesses are sharing or selling to third party affiliates. Some studies indicate people prefer control over who sends them solicitations. The current disclosure allows users to select on an individual product basis to share person identifiable information with manufacturers, distributors or brands associated with each product. Identifiable information includes, but is not limited to, data like name, address, email or social media identifiers.

The current industry approach is business centric. In the current disclosure, the approach is user centric and provides a platform for hosting an inventory of shipment or products registered for each user by any number of manufacturers, distributors or brands. This enables an easier method for proof of ownership in the event of theft or loss. Scanning of a shipment or product code also makes the process simpler than manually entering long sequences of characters. Additionally, the current disclosure supports each user's control over sharing their personal information and control is at each shipment or product level.

Another unique component of the current disclosure is crowdsourcing the reporting of counterfeit goods. Using the application on a portable device, like a mobile phone, users are prompted by the current disclosure for additional information when an invalid, falsified or duplicate shipment or product code is detected. Invalid or falsified shipment or product codes are codes that do not exactly match the combinations created by the current disclosure. The entirety of a unique shipment or product code effectively performs like a password that authenticates a shipment or product. Specifically, it verifies that a unique shipment or product code matches the valid code stored in the current disclosure.

Unique to the current disclosure is the ability to provide validation of product authenticity prior to purchase online or offline. Associated with unique product codes are a set of mapped authentication codes assigned to authorized sales channels. When a potential purchaser of product scans an authentication code, the current disclosure launches an application that provides confirmation that product is authentic or a warning that product is likely fraudulent, or product code is compromised.

If product code is fraudulent or compromised, current disclosure provides an interface for user to enter multimedia information about location, merchant, URL or other identifiers of location or entity supplying fraudulent or compromised product. This information is immediately sent to a configurable list of people or addresses as a form of notification.

User supplied information about counterfeits is augmented by an authenticated user's credentials and geolocation information. Reported information, in addition to being recorded in the current disclosure, is also conveyed through an alert, email or mobile device notification to the current registered owner's pre-defined contact list.

Information gathered during and post purchase, including reports of compromised codes or products, are included a products full history as part of capturing what a product is made of, where a product and its components come from, and what has been done or actions associated with this product. Full product history information is captured in the underlying Merkle tree-based data store as the system of record.

Authentication codes expire and are unique to an online shopping session. This prevents unauthorized copying and re-use of valid authentication codes in other online marketplaces or sales channels.

Because a user is logged into the current disclosure's systems to scan or access these authentication codes, this process provides a trusted third party to validate that online marketplaces or sales channels are authorized to sell authentic products.

In the current disclosure, proprietary algorithms for comparison and association of shipment or product codes are used to provide authentication of shipment or product from multiple sales channels, including physical stores and online commerce platforms. For online commerce platforms, access to the current disclosure's authentication algorithms are through an application programming interface.

If authentication code is successfully decrypted and validated by current disclosure, user is presented with an option to directly purchase this product. Integration of authentication codes, validation, reporting and purchase is handled through proprietary algorithm interfaces with current disclosure. This provides a standard mechanism for integration with online marketplaces or other sales channels. Online marketplaces or other sales channels would access specific processes, tasks and events using an application programming interface.

Once purchase is transacted through the current disclosure's buy interface or through the online commerce platform's purchase process, product is automatically registered to the purchaser. Pertinent product and user information is exchanged through the current disclosure's application programming interface.

On receipt of product, registered user can scan the unique product identifier to verify that authenticate product was delivered. This prevents product shippers from inadvertently or fraudulently delivering counterfeit or switched products.

To keep data stored across distributed heterogeneous data stores in sync, the current disclosure uses proprietary algorithms to support commit and rollback actions in both noSQL and Merkle tree-based data stores. In rollback algorithms, data states are maintained and managed such that data can be reverted to a previous state. Rollback is used to maintain integrity of data, especially in the event of failure or an incomplete operation. Commit algorithms make data and data structure changes visible to other distributed data stores.

While preferred embodiments of the disclosure have been described herein, many variations are possible which remain within the concept and scope of the disclosure. Such variations would become clear to one of ordinary skill in the art after inspection of the specifications and the drawings. The disclosure therefore is not to be restricted except within the spirit and scope of any appended claims.

We claim:

1. A product authentication management system comprising:
   a relational Merkle tree data store comprising at least one a child node and an additional child node, wherein:
   the child node has a linked parent node of a first Merkle tree,
   the linked parent node is tagged with a hash of the child node, and
   the child node and the additional child node are each tagged with an inverse hash of the linked parent node prior to the relational Merkle tree data store receiving a request for a product history of a product, wherein the inverse hash is exclusively a cryptographic hash of the linked parent node, wherein the inverse hash is used to perform a bi-directional traversal of the relational Merkle tree data store to retrieve the product history for the request, and wherein the relational Merkle tree data store comprises the product history of the product; and
   a noSQL data store comprising at least one replicated child node, at least one replicated parent node, at least one replicated hash, and at least one replicated inverse hash, wherein the at least one replicated child node, the at least one replicated parent node, the at least one replicated hash, and the at least one replicated inverse hash are copied from and synchronized to a portion of the relational Merkle tree data store, and wherein authenticity of the product is validated using data retrieved from the relational Merkle tree data store or the noSQL data store based on different retrieval methods and data retrieval performance of the relational Merkle tree data store and the noSQL data store, wherein the first Merkle tree originates from a first root node and a second Merkle tree originates from a second root node, and wherein the child node of the first Merkle tree and a second child node of the second Merkle tree each correspond to different data blocks comprising different content, wherein the child node of the first Merkle tree and the second child node of the second Merkle tree are each tagged with a single lateral hash labeling a peer relationship between the child node of the first Merkle tree and the second child node of the second Merkle tree.

2. The system of claim 1, wherein the noSQL data store further comprises at least two replicated lateral hashes, wherein the at least two replicated lateral hashes are copied from and synchronized with the portion of the relational Merkle tree data store.

3. A method of synchronizing a heterogeneous data store platform, comprising:
   providing a relational Merkle tree data store comprising a child node and an additional child node, wherein:
   the child node has a linked parent node of a first Merkle tree,
   the linked parent node is tagged with a hash of the child node, and
   the child node and the additional child node are each tagged with an inverse hash of the linked parent node prior to the relational Merkle tree data store receiving a request for a product history of a product, wherein the inverse hash is exclusively a cryptographic hash of the linked parent node, wherein the inverse hash is used to perform a bi-directional traversal of the relational Merkle tree data store to retrieve the product history for the request, and wherein the relational Merkle tree data store comprises the product history of the product;
   replicating the child node, the linked parent node, the hash and the inverse hash in the relational Merkle tree data store into at least one replicated child node, at least one replicated linked parent node, at least one replicated hash, and at least one replicated inverse hash in a noSQL data store;
   comparing a portion of the noSQL data store to the relational Merkle tree data store;
   finding the replicated hash to match the hash and the replicated inverse hash to match the inverse hash;
   completing the synchronization; and
   validating authenticity of the product using data retrieved from the relational Merkle tree data store or the noSQL data store based on different retrieval methods and data retrieval performance of the relational Merkle tree data store and the noSQL data store, wherein the child node of the first Merkle tree and a second child node of the second Merkle tree each correspond to different data blocks comprising different content, wherein the first Merkle tree originates from a first root node and a second Merkle tree originates from a second root node, and wherein the child node of the first Merkle tree and a second child node of the second Merkle tree are each tagged with a single lateral hash labeling a peer relationship between the child node of the first Merkle tree and the second child node of the second Merkle tree.

4. The method of claim 3, further comprising:
   determining that at least one the replicated hash does not match the hash or that the at least one replicated inverse hash does not match the inverse hash.

5. The method of claim 4, further comprising, in response to determining that the at least one replicated hash does not match the hash or that the at least one replicated inverse hash does not match the inverse hash:
   erasing the noSQL data store; and
   replicating the child node, the linked parent node, the hash and the inverse hash in the relational Merkle tree data store into at least one replicated child node, replicated parent node, replicated hash, and replicated inverse hash in the noSQL data store.

6. The method of claim 5, further comprising:
   comparing the portion of the noSQL data store to the relational Merkle tree data store utilizing the relational Merkle tree data store as primary; and
   finding the replicated hash to match the hash in the relational Merkle tree data store and the replicated inverse hash to match the inverse hash in the relational Merkle tree data store.

7. The method of claim 3, wherein:
   the replicating further comprises replicating the single lateral hash of the child node and the second child node into a replicated lateral hash in the noSQL data store; and finding the at least one replicated hash further comprises finding the replicated lateral hash to match the single lateral hash.

* * * * *